United States Patent Office 3,515,848
Patented June 2, 1970

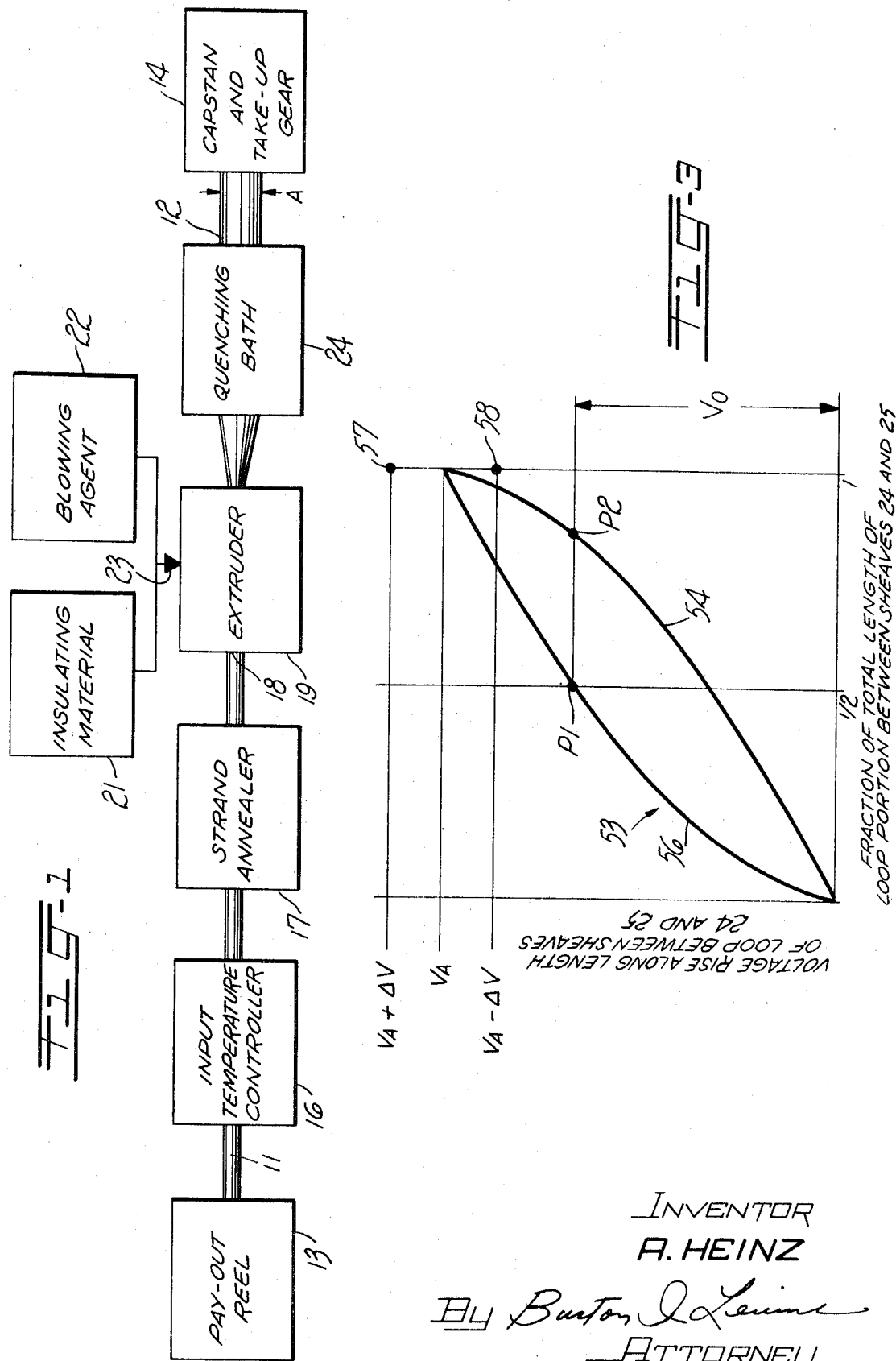

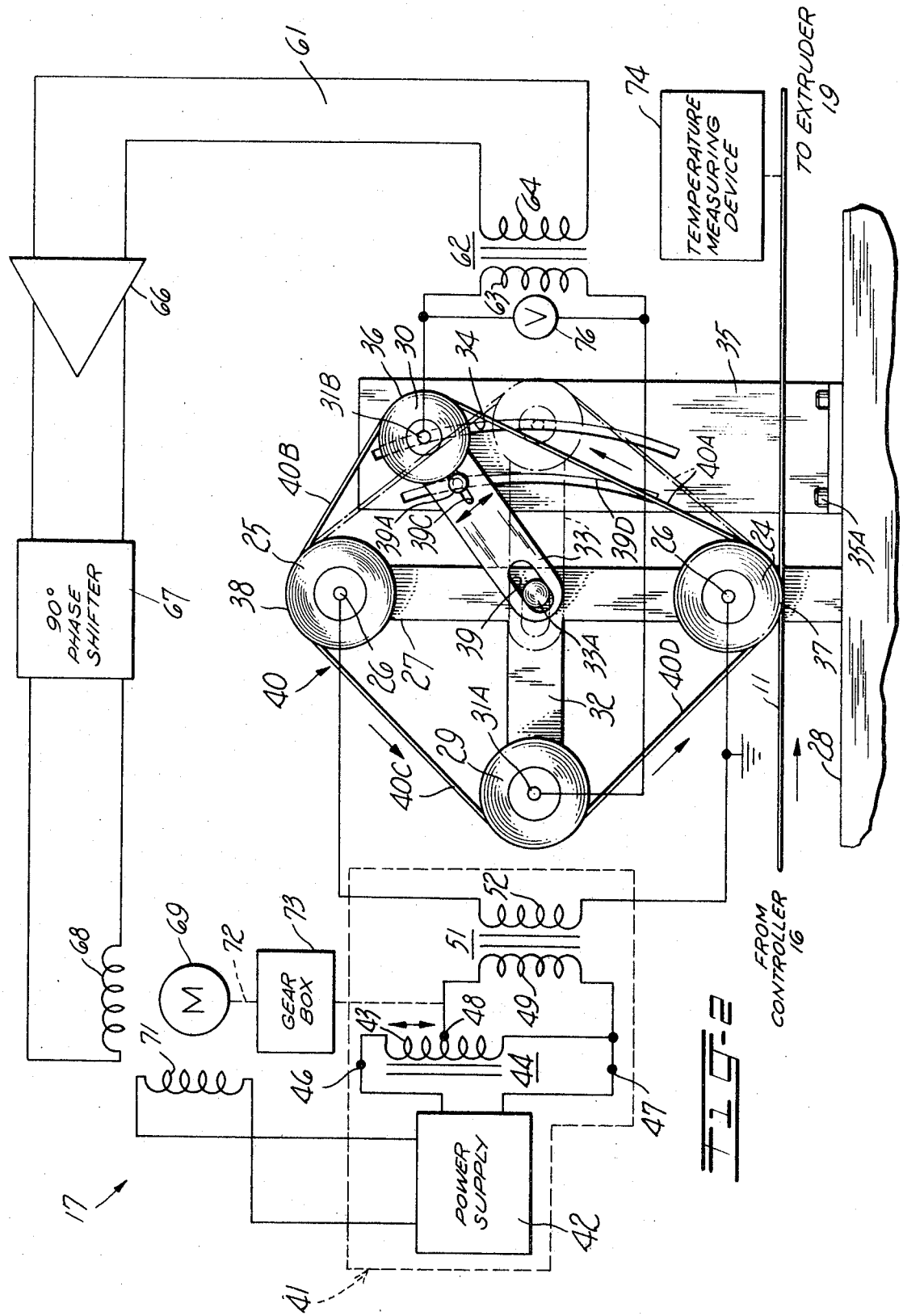

3,515,848
TEMPERATURE CONTROLLABLE STRAND ANNEALER
Alfred Heinz, Flemington, N.J., assignor to Western Electric Company, Incorporated, New York, N.Y., a corporation of New York
Filed Mar. 18, 1968, Ser. No. 713,790
Int. Cl. C21d 9/62; H05b 1/00
U.S. Cl. 219—155                                16 Claims

ABSTRACT OF THE DISCLOSURE

A moving wire having a temperature-variable resistance is routed around a fixed pair and a movable pair of electrically conductive sheaves that are alternately arranged to define a closed loop. An adjustable source of heating current is connected across the fixed pair of sheaves for effecting a desired temperature rise through the loop. A null voltage is obtained across the movable pair of sheaves by varying the position of at least one of the latter sheaves within the loop. A feedback path responsive to the voltage across the movable pair adjusts the magnitude of the heating current to thereafter maintain the null condition and thus the predetermined temperature rise through the loop.

Background of the invention

In general, conductive strands that are employed in telephone cable and the like are provided with an extruded plastic coating. The bare strand is prepared for coating by passing a continuous run of the strand through an annealer, which heats the strand to a temperature (usually about 200° F.) suitable to efficiently receive an extruded jacket of plastic insulation as the strand is passed throuh a die adjacent the output of the annealer.

Presently employed annealers of this type subject the bare strand passing therethrough to highly variable temperature rises because of fluctuations in strand speed, strand resistivity, heating current, and similar factors. Thus even where the strand temperature at the annealer input is held reasonably constant, these wide variations (e.g., 20% or more) in the temperature rise through the annealer, and thus the variations in the strand temperature in the extruder, cause corresponding perturbations in the properties of the coated strand at the output of the extruder. It has been found that variations of this magnitude do not unduly affect the quality of voice frequency communications over telephone cables employing such coated strands.

Unfortunately, the above-mentioned wide variations in the coated strands manufactured in this way are intolerable when the resulting cables are used for data communications, which necessitates the faithful transmission and reproduction of the sharp leading and trailing edges of coded pulses. It has been ascertained that in order to assure sufficient uniformity of coated strands destined for data-quality cable, the bare strand should enter the extruding die from the annealer with an elevated temperature that varies no more than ±1.5% from the optimum nominal value for extrusion.

Summary of the invention

The present invention provides an annealer configuration that can establish and maintain a substantially uniform temperature rise so that the elevated strand temperature at the input of the extruder is within the required close tolerances.

In an illustrative embodiment of the annealer a first pair of conductive elements (e.g. sheaves) are mounted in fixedly spaced relation on a post. A second pair of conductive sheaves, at least one of which is movable in the plane of the first pair, are individually mounted on arms extending outwardly from opposite sides of the post. A continuous bare strand having a substantially uniform ambient temperature is advanced through a reentrant loop that passes around successive sheaves in the first and second pairs. The strand enters and leaves the loop via a common one of the first pair of sheaves.

As the strand moves continually around the reentrant loop, a suitable source forces a heating current through the first pair of sheaves to establish a temperature gradient from the input to the output of the loop. The current magnitude is initially adjusted such that the temperature rise through the loop establishes, at the output of the loop, the desired elevated temperature for extrusion. When the desired temperature rise is obtained, the movable sheave is positioned until a null voltage appears between the sheaves in the second pair. Subsequent deviations in the temperature rise through the loop caused by variations in strand speed, heating current, strand diameter and the like are compensated by a feedback path that is rendered effective upon the deviation from the null condition, of the voltage between the second pair of sheaves. The feedback path adjusts the magnitude of the heating current to restore the null condition and thus the predetermined temperature rise.

Brief description of the drawing

The nature of the invention and its advantages will appear more fully from the following detailed description taken in conjunction with the appended drawing, in which:

FIG. 1 is a block diagram of a typical process for manufacturing a coated strand for a telephone cable;

FIG. 2 is a diagrammatic representation of a bridge-type strand annealer constructed in accordance with the invention for use in the process of FIG. 1; and FIG. 3 is a curve showing the variation of voltage in the bridge portion of the annealer shown in FIG. 2.

Detailed description

Referring now in more detail to the drawing, FIG. 1 shows a succession of various processing stations utilized for coating a continuous strand 11 with a cellular insulating jacket 12 of overall diameter A. The strand 11 is assumed to be formed from conductive material (such as copper) whose electrical resistance varies with temperature. The strand 11, which may initially be wound on a reel 13, is advanced through the various stations at constant speed by a suitably driven capstan 14.

The strand 11 initially passes through an input temperature controller 16, which may be a thermostatically controlled room or chamber for maintaining the strand at a substantially uniform temperature $T_A$ (illustratively about 80° F.).

The temperature-stabilized strand 11 is then passed through a strand annealer 17. The annealer 17 electrically heats the strand to raise its temperature to a nominal value suitable for extrusion (preferably about 200° F.).

The heated strand enters a port 18 of a cross-head extruder 19 located adjacent the annealer 17. As described fully in U.S. Pat. 3,300,554 (issued Jan. 24, 1967), a heated mass of a moldable insulating material (such as polypropylene) from a source 21 may then be continually introduced, together with a suitable blowing agent from a source 22, into a second port 23 of the extruder 19. Within the extruder 19 a suitable pressure drop is maintained which, because of the presence of the blowing agent, causes the insulating material to expand within the extruder so that it forms the cellular jacket 12 around the advancing strand. Typically, the jacket will have radially expanded to within approximately 10% of its final diameter A while still within the extruder.

Upon the exit of the coated strand from the extruder, the jacket 12 undergoes a slight further expansion and is quenched in a suitable bath 24 at the point where the desired overall diameter A is reached. The finished coated strand is then collected on the take-up gear 14 for further processing, e.g., assembly into telephone cable (not shown).

In order to assure the required uniformity of the coated strands to enable the latter to be used in data-quality cable, it has been ascertained that the temperature $T_B$ of the heated strand 11 entering the extruder 19 should be held to the desired nominal value of 200° F. within very close tolerances (preferably ±1.5%). Thus even with the regulation of input temperature $T_A$ provided by the controller 16, the temperature rise $\Delta T$ through the annealer 17 must be held substantially invariant despite changes in the annealer heating current, strand speed, strand diameter, and the like.

In accordance with the invention a uniform predetermined temperature rise $\Delta T$ may be established and maintained in the moving strand with the strand annealer construction shown in FIG. 2. A first pair of electrically conductive sheaves 24 and 25 are rotatably mounted on a pair of conductive pins 26—26 which are disposed in fixedly spaced relation on a vertical post 27. The post 27, which is assumed to be constructed from a suitable insulating material, is affixed to a base 28.

A second pair of electrically conductive sheaves 29 and 30 are rotatably mounted on a second pair of conductive pins 31A and 31B that are disposed on a pair of arms 32 and 33, respectively. The arms 32 and 33 are formed from insulating material and extend outwardly from opposite sides of the post 27 intermediate the sheaves 24 and 25. The arm 32 is rigidly affixed to the post 27 and is disposed perpendicularly thereto. The arm 33 is pivotally mounted on the post 27, as by a pin 33A, for accurate movement in a vertical plane through a selectable distance.

The sheave 30 is constrained for movement in an elliptical track 34, which is disposed in a vertical member 35 for slidably receiving the sheave pin 31B. The member 35 is affixed to the base 28, as by a plurality of screws 35A—35A. The elliptical track 34 is shaped in such a manner that a radially outermost point 36 of the sheave 30 defines, during the movement of the pin 31B in the track, a corresponding ellipse (not illustrated) whose foci are coincident with a pair of radially outermost points 37 and 38 of the sheaves 24 and 25, respectively. Thus, the sum of the successive distances between the points 37 and 36 and the points 36 and 38 remains sensibly constant for any position of the sheave 30.

The mounting pin 33A is received in an elongated slot 39 in the arm 33 to effect the required radial variations in the position of the arm 33 as the sheave 30 moves along the track 34. Once the sheave 30 is moved to a desired position along its elliptical path (as described below), it may be held in that position by a suitable releasable fastener 39A which extends through a pair of elongated slots 39C and 39D disposed in the arm 33 and the member 35, respectively.

The strand 11 exiting from the controller 16 is advanced by the capstan 14 (FIG. 1) through the annealer 17 in a continuously moving reentrant loop 40 (FIG. 2). The loop 40 proceeds in a counterclockwise direction (as viewed in the figure) around the bottom sheave 24 of the first pair, the right sheave 30 of the second pair, the top sheave 25 of the first pair, the left sheave 29 of the second pair, and finally around the bottom sheave 24 again. The bottom sheave 24 forms a common input and output region of the loop 40. Each sheave makes electrical contact with the adjacent portion of the moving strand.

The loop 40 effectively includes two parallel portions between the first pair of sheaves 24 and 25. One loop portion includes a pair of segments 40A (between the outer points 37 and 36 of the sheaves 24 and 30) and 40B (between the outer points 36 and 38 on the sheaves 30 and 25), whose relative lengths are selected by positioning the arm 33 to vary the point of engagement 36 of the sheave 30 and the loop 40. Because of the elliptical path followed by the point 36, the sum of the segments 40A and 40B will be constant. The other loop portion includes a pair of fixed equal length segments 40C (between the sheaves 25 and 29) and 40D (between the sheaves 29 and 24). With this arrangement, the length of the loop 40 (i.e., the sum of the segments 40A–40D) will be constant irrespective of the position of the arm 33.

It will be recalled that the function of the strand annealer is to raise the temperature of the strand 11 by a controlled amount $\Delta T$ above the ambient $T_A$. This may be accomplished, in the context of the arrangement of FIG. 2, by establishing the required temperature rise through the reentrant loop 40.

For this purpose, a heating current is caused to flow through the loop 40 by impressing an adjustable voltage from a source 41 across the first pair of sheaves 24 and 25. The source 41 includes a fixed power supply 42 whose output is applied across a winding 43 of a variable autotransformer 44. The winding 43, which is accessible through a pair of terminals 46 and 47, will be designated the "primary portion" of the autotransformer. The output of the latter is taken between a portion of the winding 43 bounded between a movable tap point 48 and the terminal 47. This latter portion will be designated the "secondary portion" of the autotransformer. The output of the secondary portion is impressed across a primary winding 49 of the transformer 51. The output of the transformer 51, which is taken across a secondary winding 52, constitutes the output of the source 41. The resistance of the secondary winding 52 is made significantly greater than the unavoidable contact resistance between each sheave and the moving loop 40.

The amplitude $V_A$ of the output voltage from the source 41, and thus the amplitude of the heating current applied to the loop 40, may be varied by adjusting the position of the tap point 48 on the autotransformer 44.

Beuause of the counterclockwise movement of the strand 11 around the loop 40, the portions of the moving strand instantaneously coincident with the successive loop portions 40A–40D will have been exposed to the heating current in the loop for successively increasing intervals of time following their entry into the loop. Thus, if an overall temperature rise $\Delta T$ is established through the loop by the source 41, the successive segments 40A, 40B, 40C, and 40D will be subjected to successively increasing portions of that total temperature rise.

The resistance of the copper strand 11 (which is assumed to be at an initial value $R_A$ corresponding to the ambient temperature $T_A$) will increase with increasing temperature. Thus the temperature rise in the loop caused by the application of the heating current thereto by the source 41 will change the resistance in the loop. The resistance variation within the loop, however, will be nonlinear. Each portion of the moving strand entering the loop 40 is subjected to a heating current that remains constant during the movement of the portion from sheave to sheave. As the moving portion heats up, its resistance increases steadily and, as a consequence, it absorbs a successively higher portion of the power in the particular one of the segments 40A–D in which it is then disposed. The increased power absorption, in turn, successively increases the resistance of the portion. Generally, the resistance change of the moving strand in segments 40A and 40B is exponential with increasing distance along the loop. The same is true with the resistance in the portion of the loop occupying the segments 40C and 40D.

A curve 53 (FIG. 3), which illustrates the portion of the total voltage rise $V_A$ between the excited sheaves 24 and 25 (FIG. 2) associated with each point of the loop, depicts this nonlinearity. The sheave 24 is assumed to be at ground potential. A lower segment 54 (FIG. 3) of the curve 53 represents the voltage variation between the sheaves 24 and 25 (FIG. 2) along the segments 40A and 40B. An upper segment 56 (FIG. 3) of the curve 53 illustrates the variation of voltage between the sheaves 24 and 25 (FIG. 2) along the segments 40C and 40D.

A point P1 (FIG. 3) on the upper segment 56 represents a voltage $V_O$, with respect to the grounded sheave 24 (FIG. 2), at the fixed location of the sheave 29; i.e. halfway between the sheaves 24 and 25. A point P2 (FIG. 3) on the lower segment 54 of the curve 53 represents the loop voltage at one possible location of the sheave 30 (FIG. 2), i.e., the location whose voltage is equal to the voltage $V_O$ of the point P1 (FIG. 3) so that a null voltage exists between the points P1 and P2. It will be understood that the point P2, and thus its voltage with respect to the fixed point P1, will vary with changes in the position of the arm 33 (FIG. 2).

If the voltage $V_A$ between the sheaves 24 and 25 rises by an increment $\Delta V$ from the position shown in FIG. 3 (corresponding to an increase in heating current and thus the total temperature rise through the loop), the curve 53 will be elevated and expanded with respect to the position shown in the figure so that it terminates, e.g., at a point 57. In such a case the voltage at points P1 and P2 (FIG. 3) will each be effectively increased, but with the increase in voltage of point P2 being smaller than the increase in voltage of point P1. The point P2 will therefore be negative with respect to the point P1. If the voltage $V_A$ decreases by the increment $\Delta V$ from the position shown (corresponding to a decrease in the loop heating current and a consequent decrease in the temperature rise through the loop), the curve 53 is lowered and compressed from the position shown in the figure to terminate, e.g., at a point 58. In such a case, the voltage at the points P1 and P2 will each be effectively decreased, but with the decrease in voltage of point P2 being smaller than the decrease in voltage of point P1. The point P2 will therefore be positive with respect to the point P1.

As a result, the voltage (hereafter designated $V_B$) of the selected point P2 relative to the fixed point P1 (and thus the voltage between the sheaves 29 and 30 of FIG. 2) will vary incrementally in one of two opposite directions from the null condition illustrated in FIG. 3 in proportion to the incremental variation of the temperature rise through the loop 40 in an associated one of two opposite directions.

The above-noted dependence of the voltage $V_B$ on the total temperature rise $\Delta T$ through the loop may be employed, in accordance with the invention, to maintain the temperature rise $\Delta T$ constant at a predetermined value. To do this, the loop 40 is connected as a bridge that is balanced only when the desired temperature rise $\Delta T$ has occurred. The input of the bridge is taken between the sheaves 24 and 25 so that the bridge input voltage corresponds to the voltage $V_A$. The output of the bridge is taken between the sheaves 29 and 30, so that the bridge output voltage corresponds to the voltage $V_B$.

The bridge may be balanced empirically by (a) adjusting the voltage $V_A$ (and therefore the heating current) until a desired temperature rise is established through the loop, and then (b) moving the point of contact between the sheave 30 and the loop 40 (i.e., the point P2 of FIG. 3) until the voltage $V_B$ is zero. (It will be appreciated that because of the invariant length of the loop 40, the movement of the point of contact will not, of itself, change the total temperature rise through the loop.) Once this null position of the bridge for the desired temperature rise $\Delta T$ is set, the subsequent maintenance of such a null condition at this position (i.e., by adjusting the heating current applied to the loop) will maintain the loop temperature rise at the desired value $\Delta T$ irrespective of changes in speed of advance of the strand 11, the stability of the source 41, the diameter of the strand, and similar conditions.

In order to maintain the null condition of the bridge at this position of the sheave 30 (FIG. 2), a control loop 61 is provided between the output and the input of the bridge. The loop 61 is rendered effective upon the deviation of the bridge output voltage from the null condition for adjusting the heating current applied to the loop. In particular, the loop adjusts the voltage across the terminals of the source 41 to maintain the null condition of the bridge output and thus the original temperature rise $\Delta T$.

The loop 61 includes an output transformer 62 having a primary winding 63 connected across the sheaves 29 and 30. The resistance of the primary winding 63, like that of the secondary winding 52 in the input transformer 51, is made significantly greater than the contact resistance between each sheave and the moving loop 40. A secondary winding 64 of the transformer 62 is connected to the input of an amplifier 66.

The output voltage of the amplifier is applied through a 90° phase shifter 67 to a control winding 68 of a two phase motor 69. A power or line winding 71 of the motor 69 is coupled directly to the output of the power supply 42 in the source 41. Thus the control and the power windings 68 and 71, which are physically disposed in space quadrature, may be excited in time quadrature by virtue of the phase shifter 67 in the loop 61.

An output shaft 72 of the motor 69 is mechanically linked through a suitable gear box 73 to the movable tap point 48 of the autotransformer 44. With this arrangement, a rotation of the motor shaft 72 moves the tap point 48 along the winding 43 to vary the output voltage of the source 41 and thereby the loop heating current.

To utilize the overall strand annealer of FIGS. 2–3 in the arrangement of FIG. 1 to establish and maintain a rise $\Delta T$, it will be assumed that the input temperature controller 16 is set to maintain the temperature $T_A$ at the ambient value of 80° F. within close tolerances. As the strand 11 advances through the reentrant loop 40 (FIG. 2), the source 41 applies heating current to the loop via the sheaves 24 and 25. The heating current of the source 41 is adjusted until the desired temperature rise $\Delta T$ occurs through the loop, e.g., until the temperature $T_B$ at the output of the loop is 200° F. as measured, e.g., by a suitable temperature measuring device 74. This initial adjustment may be accomplished, e.g., by disengaging the motor 69 and the gear box 73 from the tap point 48 and manually moving the tap point until the required heating current is applied to the loop. When the desired temperature rise is reached, the position of the arm 33 is adjusted until the bridge output voltage (as monitored, e.g., by a suitable voltmeter 76) is zero. The arm 33 is then locked in this position by the fastener 39A.

As long as the bridge remains balanced, i.e., as long as the voltage across the output terminals of the bridge remains zero, the voltage at the control winding 68 will likewise be zero and the output shaft 72 of the motor will be stationary. Thus the position of the movable tap on the autotransformer will remain in its preset position. If the temperature rise through the loop 40 thereafter deviates from the desired value $\Delta T$ for any of the reasons indicated above, the bridge output voltage will deviate from its null condition. This voltage deviation, which forms a control voltage for the loop 61 (FIG. 2), is effectively coupled through the transformer 62 (FIG. 2), the amplifier 66 and the phase shifter 67 to excite the control winding 68. The rotating field established by the cooperation of the quadrature-excited windings 68 and 71 thereupon rotates the motor shaft 72. The latter positions the movable tap 48 on the autotransformer 44 through the gear box 73 to vary the heating current from the source 41 in a direction to restore the total temperature rise through the loop to its preset value $\Delta T$.

It will be noted that since the voltage $V_B$ between the sheaves 29 and 30 is zero in the steady state, no potential drop due to contact resistance can develop between the sheaves 29 and 30. Changes in the contact resistance between each sheave and the loop under different heating conditions will not affect the balance position of the bridge.

What is claimed is:

1. In a method of establishing a fixed temperature rise between a first and second point along the path of a continuously advancing conductor whose resistance varies with temperature, the steps of:

routing the advancing conductor through a reentrant loop having a common input and output region with the first point located on the input side of the common region and the second point located on the output side of the common region;

applying an electrical heating current to the loop between the common region and a third fixed point on the loop spaced from the common region to impart a temperature rise through the loop; and adjusting to equal magnitudes the electrical potentials of fourth and fifth preselected points along the loop which are disposed intermediate the common region and the third fixed point on respectively opposite sides of the loop, the magnitude of the fixed temperature rise being determined by the magnitude of the resultant electrical potentials.

2. In a method of establishing and maintaining a predetermined temperature rise in a continuously moving conductor whose resistance varies with temperature, the steps of:

routing the moving conductor through a reentrant loop that has a common input and output region;

impressing a voltage between the common region and a fixed point of the loop spaced from the common region to force heating current through the loop of a sufficient magnitude to effect the temperature rise through the loop;

detecting, during the voltage impression, a pair of auxiliary intermediate points on opposite sides of the loop which exhibit equal predetermined potentials when the predetermined temperature rise has occurred; and adjusting the magnitude of the impressed voltage when the potentials of the auxiliary points become unequal to restore the equal potential condition of the auxiliary points, and thereby maintain the predetermined temperature rise.

3. A method as defined in claim 2, in which the routing step is accomplished by passing the conductor through a reentrant loop of fixed length.

4. In an apparatus for establishing a temperature rise between first and second points along the path of movement of a continuously advancing electrical conductor;

means for supporting the advancing conductor in a reentrant loop having a common input and output region with the first point located on the input side of the common region and the second point located on the output side of the common region, the supporting means including a first pair of conductive elements respectively engaging the moving conductor at the common region and at an opposite point in the loop;

externally variable means for impressing a voltage across the first pair of elements to cause heating current to flow in the loop to produce a temperature rise therethrough;

a second pair of conductive elements engaging the moving conductor at a pair of relatively selectable points around the loop intermediate the first pair of elements and disposed on relatively opposite sides of the loop; and control means for adjusting the potentials at the second pair of elements to a selectable value when the voltage is being impressed through the loop, the magnitude of the temperature rise being determined by the selectable value.

5. Apparatus as defined in claim 4 wherein the control means includes means for equalizing the potentials of the second pair of elements to establish a null condition between the second pair of elements.

6. Apparatus as defined in claim 5 wherein the control means includes means rendered effective upon a deviation of the last-mentioned potentials from the null condition for adjusting the magnitude of the voltage across the first pair of elements in a direction tending to restore the null condition of the last-mentioned potential.

7. In a bridge type apparatus for establishing and maintaining a selectable temperature rise along a conductor whose resistance varies with temperature;

first and second pairs of conductive elements respectively defining the input and output terminals of the bridge;

first means for supporting the first pair of elements in fixedly spaced relation along a rectilinear path;

second means for supporting the second pair of elements at a pair of selectable points respectively intermediate the first pair of elements and disposed on opposite sides of the rectilinear path to form a closed loop, the location of the selectable points being indicative of the magnitude of the temperature rise;

means for advancing the moving conductor around the closed loop in engagement with the alternate elements in the first and second pairs;

adjustable means for applying a voltage across the input terminals of the bridge of a magnitude effective to establish a null voltage condition between the output terminals of the bridge; and means rendered effective when the output voltage deviates from the null condition for adjusting the voltage applied to the input terminals of the bridge to restore the null condition of the output voltage.

8. Apparatus as defined in claim 7, in which the first pair of elements comprise electrically conductive sheaves, and the first supporting means comprises, in combination, a post, and means for supporting the sheaves in spaced relation on the post.

9. Apparatus as defined in claim 8, in which the second supporting means comprises, in combination, a pair of arms extending outwardly from respectively opposite sides of the post intermediate the pair of sheaves, and means for individually affixing the second pair of elements to the pair of arms.

10. Apparatus as defined in claim 9, in which a first one of the arms is fixedly mounted to the post, and the apparatus further comprises means for mounting a second one of the arms on the post for movement in the plane of the loop.

11. Apparatus as defined in claim 10, in which one element of the second pair is mounted on one end of the second arm, and in which the mounting means comprises, in combination, means for pivoting the other end of the second arm on the post, and a member coupled to the one end of the second arm and having an elliptical track for receiving and guiding the one element of the second pair.

12. Apparatus as defined in claim 7, in which the variable voltage-applying means comprises, in combination, an autotransformer having a fixed primary portion and an adjustable secondary portion, means for applying a constant voltage across the primary portion, and means for coupling the secondary portion across the input terminals of the bridge.

13. Apparatus as defined in claim 12, in which the autotransformer has a movable tap to vary the secondary portion, and the adjusting means comprises, in combination, electrically operable drive means having an output shaft coupled to the movable tap of the autotransformer, and means coupling the output voltage of the bridge to an input of the drive means.

14. Apparatus as defined in claim 13, in which the drive means comprises a two-phase motor having a power winding and a control winding operable in phase quadrature, the coupling means comprises a 90° phase shifter interconnecting the output terminals of the bridge to the control winding, and the apparatus further comprises means for coupling the constant voltage-applying means to the power winding.

15. In an apparatus for maintaining constant a temperature change in an advancing strand of electrically conductive material:
   an arrangement of four strand contact elements;
   first means for mounting one of the elements to move in an elliptical path;
   second means for mounting two of the other elements at the foci of the elliptical path and for mounting the remaining element at a point equally spaced from the foci;
   means for advancing a loop of the strand about the elements;
   means for applying heating current to the two elements at the foci to provide a null voltage condition across the movable element and the remaining element; and
   means responsive to a deviation of the voltage across the movable element and the remaining element from the null condition for varying the heating current to restore the null voltage condition.

16. Apparatus as defined in claim 15, further comprising means for adjustably setting the position of the movable element at a selected point in the elliptical path.

References Cited

UNITED STATES PATENTS 2,432,801  12/1947  Rendel _____ 219—155

JOSEPH V. TRUHE, Primary Examiner

L. A. ROUSE, Assistant Examiner